(12) United States Patent
Zimmermann et al.

(10) Patent No.: US 7,718,592 B2
(45) Date of Patent: May 18, 2010

(54) SODIUM PERCARBONATE PARTICLES HAVING A SHELL LAYER COMPRISING THIOSULFATE

(75) Inventors: Klaus Zimmermann, Viersen (DE); Harald Jakob, Hasselroth (DE)

(73) Assignee: Degussa, GmbH, Dusseldorf (DE)

( * ) Notice: Subject to any disclaimer, the term of this patent is extended or adjusted under 35 U.S.C. 154(b) by 343 days.

(21) Appl. No.: 11/667,300

(22) PCT Filed: Oct. 12, 2005

(86) PCT No.: PCT/EP2005/010952

§ 371 (c)(1),
(2), (4) Date: Sep. 20, 2007

(87) PCT Pub. No.: WO2006/050778

PCT Pub. Date: May 18, 2006

(65) Prior Publication Data

US 2008/0045436 A1     Feb. 21, 2008

(30) Foreign Application Priority Data

Nov. 11, 2004   (DE) .................... 10 2004 054 495

(51) Int. Cl.
*C11D 7/38* (2006.01)
*C11D 7/54* (2006.01)
*C11D 7/34* (2006.01)

(52) U.S. Cl. ................. 510/224; 510/220; 510/221; 510/372; 510/375; 510/446; 252/186.27; 252/186.43

(58) Field of Classification Search ............ 510/220, 510/221, 224, 372, 375, 446; 252/186.27, 252/186.43
See application file for complete search history.

(56) References Cited

U.S. PATENT DOCUMENTS 3,830,738 A   8/1974   Cottrell
3,860,694 A   1/1975   Jayawant (Continued)

FOREIGN PATENT DOCUMENTS

AU     B-31754/95     4/1996

(Continued)

OTHER PUBLICATIONS

International Search Report for PCT/EP2005/010952, (May 2007).

(Continued)

*Primary Examiner*—Gregory R Del Cotto
(74) *Attorney, Agent, or Firm*—Law Office of: Michael A. Sanzo, LLC (57) ABSTRACT

Coated sodium percarbonate particles, having an inner shell layer which comprises at least one inorganic, hydrate-forming salt as the main constituent, and an outer shell layer which comprises an alkali metal thiosulfate, an alkaline earth metal thiosulfate and/or an ammonium thiosulfate, are stable to storage and have an improved storage stability in detergents and cleaning agents. Detergents and cleaning agents which comprise such sodium percarbonate particles show a reduced oxidative attack on oxidation-sensitive constituents of the composition during storage. Machine dishwashing agents in the form of tablets which comprise such sodium percarbonate particles and a corrosion protection agent for silver show a reduced yellowing of the tablets during storage.

22 Claims, 2 Drawing Sheets

U.S. PATENT DOCUMENTS

| | | | |
|---|---|---|---|
| 3,951,838 A | 4/1976 | Jayawant et al. |
| 4,025,609 A | 5/1977 | Matsunaga |
| 4,105,827 A | 8/1978 | Brichard et al. |
| 4,215,990 A | 8/1980 | Barrett, Jr. et al. |
| 4,325,933 A | 4/1982 | Marsumoto et al. |
| 4,409,197 A | 10/1983 | Sugano et al. |
| 4,428,914 A | 1/1984 | Brichard et al. |
| 4,526,698 A | 7/1985 | Kuroda et al. |
| 4,748,488 A | 5/1988 | Suzuki et al. |
| 4,788,052 A | 11/1988 | Ng et al. |
| 4,839,157 A | 6/1989 | Mei-King Ng et al. |
| 5,122,518 A | 6/1992 | Vrba et al. |
| 5,332,518 A | 7/1994 | Kuroda et al. |
| 5,374,368 A | 12/1994 | Hauschild |
| 5,380,456 A | 1/1995 | Woods |
| 5,462,804 A | 10/1995 | Kokubu et al. |
| 5,478,488 A | 12/1995 | Doetsch et al. |
| 5,496,542 A | 3/1996 | Hauschild |
| 5,505,875 A | 4/1996 | Beaujean et al. |
| 5,560,896 A | 10/1996 | Bewersdorf et al. |
| 5,674,436 A | 10/1997 | Breitenbach et al. |
| 5,691,296 A | 11/1997 | Agar et al. |
| 5,695,679 A | 12/1997 | Christie et al. |
| 5,785,934 A | 7/1998 | Jacobs et al. |
| 5,792,738 A | 8/1998 | Baillely et al. |
| 5,814,592 A | 9/1998 | Kahn et al. |
| 5,902,682 A | 5/1999 | Bertsch-Frank et al. |
| 5,902,783 A | 5/1999 | Lagnemo et al. |
| 5,906,660 A | 5/1999 | Pardini et al. |
| 5,935,708 A | 8/1999 | Schuette et al. |
| 5,965,505 A | 10/1999 | Baillely et al. |
| 6,017,867 A | 1/2000 | Baillely |
| 6,022,404 A | 2/2000 | Ettlinger et al. |
| 6,121,502 A | 9/2000 | Tembe et al. |
| 6,165,959 A | 12/2000 | Meyer et al. |
| 6,194,368 B1 | 2/2001 | Waschenbach et al. |
| 6,218,352 B1 | 4/2001 | Lee et al. |
| 6,239,095 B1 | 5/2001 | Bertsch-Frank et al. |
| 6,267,934 B1 | 7/2001 | Pardini et al. |
| 6,290,775 B1 | 9/2001 | Kohlen et al. |
| 6,299,773 B1 | 10/2001 | Takamura et al. |
| 6,387,861 B1 | 5/2002 | Van Asperen et al. |
| 6,521,583 B1 | 2/2003 | James et al. |
| 6,602,837 B1 | 8/2003 | Patel |
| 6,734,155 B1 | 5/2004 | Herbots et al. |
| 7,435,714 B2 | 10/2008 | Kottke |
| 2002/0041843 A1 | 4/2002 | Jakob et al. |
| 2003/0104967 A1 | 6/2003 | Jakob et al. |
| 2003/0160209 A1 | 8/2003 | Hoffman et al. |
| 2005/0239681 A1 | 10/2005 | Speckmann et al. |
| 2006/0014658 A1 | 1/2006 | Zimmermann et al. |
| 2006/0249707 A1 | 11/2006 | Zimmermann et al. |
| 2007/0055009 A1 | 3/2007 | Hasenzahl et al. |

FOREIGN PATENT DOCUMENTS

| | | |
|---|---|---|
| CA | 2 170 599 | 3/1995 |
| CA | 2326560 | 5/2001 |
| CA | 2 511 022 | 7/2004 |
| DE | 870 092 | 3/1953 |
| DE | 962 251 | 4/1957 |
| DE | 2 013 763 | 10/1971 |
| EP | 0 367 934 | 5/1990 |
| EP | 0 623 553 A1 | 11/1994 |
| EP | 0 634 478 A1 | 1/1995 |
| EP | 0 672 749 | 9/1995 |
| EP | 0 703 190 | 3/1996 |
| EP | 0 722 992 | 7/1996 |
| EP | 0 737 738 A2 | 10/1996 |
| EP | 0 962 424 | 12/1999 |
| EP | 0 970 917 | 1/2000 |
| EP | 0 992 575 A1 | 4/2000 |
| EP | 1 386 599 | 2/2004 |
| GB | 174891 | 1/1922 |
| GB | 1 303 810 | 1/1973 |
| GB | 1 466 799 | 3/1977 |
| JP | 06-263-434 | 9/1994 |
| WO | WO 92/07057 | 4/1992 |
| WO | WO 95/02555 | 1/1995 |
| WO | WO 95/02724 | 1/1995 |
| WO | WO 95/06615 | 3/1995 |
| WO | WO 96/06801 | 3/1996 |
| WO | WO 96/14388 | 5/1996 |
| WO | WO 97/19890 | 6/1997 |
| WO | WO 97/43211 | 11/1997 |
| WO | WO 97/45524 | 12/1997 |
| WO | WO 00/71666 A1 | 11/2000 |
| WO | WO 01/34759 | 5/2001 |
| WO | WO 01/66685 A1 | 9/2001 |
| WO | WO 01/80645 | 11/2001 |
| WO | WO 02/057402 A1 | 7/2002 |
| WO | WO 2004/056954 A1 | 7/2004 |
| WO | WO-2004/056955 A1 | 7/2004 |

OTHER PUBLICATIONS

Written Opinion of the International Searching Authority for PCT/EP2005/010952, (May 2007).

International Preliminary Report on Patentability for PCT/2005/010952 filed Oct. 12, 2005.

English language translation for DE 962 251, reference B4 above, (Apr. 1957).

English language abstract for DE 2 013 763, reference B5 above, (Mar. 1970).

English language abstract for EP 0 367 934, reference B6 above, (May 1990).

English language abstract for EP 0 703 190, reference B10 above, (Mar. 1996).

English language abstract for EP 0 722 992, reference B11 above, (Jul. 1996).

English language abstract for EP 0 970 917, reference B14 above, (Jan. 2000).

English language abstract for JP 06-263434, reference B20 above, (Sep. 1994).

English language abstract for WO 95/02555, reference B22 above, (Jan. 1995).

English language abstract for WO 95/06615, reference B24 above, (Mar. 1995).

English language abstract for WO 96/06801, reference B25 above, (Mar. 1996).

English language abstract for WO 96/14388, reference B26 above, (May 1996).

English language abstract for WO 97/43211, reference B28 above, (Nov. 1997).

English language abstract for WO 01/66685, reference B32 above, (Sep. 2001).

English language translation of International patent document WO 96/06801, (Mar. 1996).

SODIUM PERCARBONATE PARTICLES HAVING A SHELL LAYER COMPRISING THIOSULFATE

CROSS REFERENCE TO RELATED APPLICATIONS

The present application represents U.S. national stage of international application PCT/EP2005/010952, which had an international filing date of Oct. 12, 2005, and which was published in English under PCT Article 21(2) on May 18, 2006. The international application claims priority to German application 10 2004 054 495.6, filed on Nov. 11, 2004. These prior applications are incorporated in their entirety herein by reference.

The invention relates to sodium percarbonate particles which comprise at least one-inorganic, hydrate-forming salt in an inner shell layer and an alkali metal thiosulfate, an alkaline earth metal thiosulfate and/or an ammonium thiosulfate in an outer shell layer. The invention furthermore relates to a process for the preparation of such sodium percarbonate particles, and to detergents and cleaning agents comprising such sodium percarbonate particles.

Sodium percarbonate is increasingly being employed as a bleaching-active constituent in detergents and cleaning agents. For this use, sodium percarbonate must have an adequate storage stability in detergent and cleaning agent formulations, since an undesirable loss of active oxygen and therefore of bleaching action otherwise occurs during storage of the detergents and cleaning agents. Sodium percarbonate is moisture-sensitive and decomposes in detergent and cleaning agent formulations under the action of moisture, with loss of active oxygen. Sodium percarbonate is therefore conventionally employed in a coated form for the preparation of detergents or cleaning agents, the shell layer preventing the action of moisture on the coated sodium percarbonate. Suitable shell layers of inorganic, hydrate-forming salts, such as, for example, sodium carbonate, sodium sulfate or magnesium sulfate and mixtures of such salts, are known, for example, from DE 24 17 572, EP-A 0 863 842 and U.S. Pat. No. 4,325,933.

In addition to storage stability in the detergent or cleaning agent, the sodium percarbonate used for the preparation of detergents and cleaning agents must also have a high storage stability in bulk, since as a rule it is stored in silos of large volume before preparation of the detergent or cleaning agent. If the sodium percarbonate does not have an adequate stability in bulk, self-accelerating decomposition of the stored material with severe evolution of heat may occur during storage in such silos. The shell material used for coating the sodium percarbonate particles should therefore undergo no exothermic heat-releasing chemical reactions with sodium percarbonate.

Some of the constituents used in detergents and cleaning agents, such as, for example, enzymes, fragrances or dyestuffs, are sensitive to oxidation, and during storage of a detergent or cleaning agent may be attacked by hydrogen peroxide, which is released from sodium percarbonate, and lose their activity. Oxidative degradation of such constituents can be avoided by adding a reducing agent to the detergent or cleaning agent. As can be seen from EP-A 0 717 102, page 9, lines 37 to 44, it is known to the person skilled in the art that sodium percarbonate is extremely incompatible with such reducing agents, in particular with sodium thiosulfate. The person skilled in the art will therefore avoid combination of sodium percarbonate with a reducing agent and keep the components which are incompatible with one another separate from one another in a detergent or cleaning agent.

For the use of sodium percarbonate in detergents and cleaning agents, there is accordingly a need for sodium percarbonate particles which simultaneously have a high stability in bulk, a good storage stability in detergent or cleaning agent formulations under the action of moisture, and a low oxidizing action on oxidation-sensitive constituents of detergents or cleaning agents.

It has now been found, surprisingly, that in sodium percarbonate particles built up according to the invention from a core of sodium percarbonate, an inner shell layer which comprises an inorganic, hydrate-forming salt as the main constituent, and an outer shell layer which comprises a thiosulfate, incompatibility of the sodium percarbonate with the thiosulfate having a reducing action no longer occurs, and such sodium percarbonate particles have a high storage stability in bulk. The sodium percarbonate particles according to the invention moreover also show an unexpectedly high storage stability in detergent and cleaning agent formulations and a reduced oxidative attack on oxidation-sensitive constituents of such formulations.

The invention accordingly provides coated sodium percarbonate particles, comprising
a) a core of sodium percarbonate,
b) an inner shell layer comprising at least one inorganic, hydrate-forming salt as the main constituent and
c) an outer shell layer comprising an alkali metal thiosulfate, an alkaline earth metal thiosulfate and/or an ammonium thiosulfate.

The invention also provides a process for the preparation of such coated sodium percarbonate particles, which comprises the steps of
a) application of an inner shell layer to a core material of sodium percarbonate by spraying on an aqueous solution in which at least one hydrate-forming inorganic salt is dissolved and
b) application of an outer shell layer to the coated material from step a) by spraying on an aqueous solution in which at least one alkali metal thiosulfate, alkaline earth metal thiosulfate and/or ammonium thiosulfate is dissolved.

The invention furthermore provides detergents and cleaning agents which comprise coated sodium percarbonate particles according to the invention.

Preferred embodiments of the detergents and cleaning agents according to the invention are detergents and cleaning agents which comprise pressed shaped bodies, the sodium percarbonate particles being a constituent of the pressed shaped bodies, and machine dishwashing agents in the form of tablets which comprise the coated sodium percarbonate particles according to the invention and a corrosion protection agent for silver.

The sodium percarbonate particles according to the invention comprise a core which substantially comprises sodium carbonate perhydrate of the composition $2\ Na_2CO_3 \cdot 3H_2O_2$. They can moreover also comprise small amounts of known stabilizers for peroxygen compounds, such as, for example, magnesium salts, silicates, phosphates and/or chelating complexing agents. The content of sodium percarbonate in the core of the sodium percarbonate particles according to the invention is preferably more than 95 wt. %, and particularly preferably more than 98 wt. %. The content of organic carbon compounds in the core is preferably less than 1 wt. %, particularly preferably less than 0.1 wt. %.

In a preferred embodiment, the core comprises small amounts of additives which have a stabilizing action on the active oxygen content, the content of stabilizing additives in the core preferably being less than 2 wt. %. Stability-increasing additives which are preferably used are magnesium salts, water-glass, stannates, pyrophosphates, polyphosphates and chelating complexing agents from the series consisting of hydroxycarboxylic acids, aminocarboxylic acids, aminophosphonic acids, phosphonocarboxylic acids and hydroxyphosphonic acids and alkali metal, ammonium or magnesium salts thereof. In a particularly preferred embodiment, the core comprises as the stabilizing additive an alkali metal silicate, preferably water-glass having an $SiO_2/Na_2O$ modulus in the range from 1 to 3, in an amount of 0.1 to 1 wt. %. In the most preferred embodiment, the core also comprises a magnesium compound in an amount of 50 to 2,000 ppm $Mg^{2+}$ in addition to this amount of alkali metal silicate.

The core of the sodium percarbonate particles according to the invention can be produced by one of the known preparation processes for sodium percarbonate. A suitable preparation process for sodium percarbonate is the crystallization of sodium percarbonate from aqueous solutions of hydrogen peroxide and sodium carbonate, it being possible for the crystallization to be carried out both in the presence and in the absence of a salting-out agent, for which reference is made by way of example to EP-A 0 703 190. Sodium percarbonate particles prepared by the crystallization process in the presence of a salting-out agent can also comprise small amounts of the salting-out agent used, such as e.g. sodium chloride. Fluidized bed build-up granulation by spraying aqueous hydrogen peroxide solution and aqueous soda solution on to sodium percarbonate seeds in a fluidized bed with simultaneous evaporation of water is likewise suitable, reference being made by way of example to WO 95/06615. The reaction of solid sodium carbonate with an aqueous hydrogen peroxide solution and subsequent drying is furthermore also a suitable preparation process. The core of the sodium percarbonate particles according to the invention is preferably obtained by fluidized bed build-up granulation. Coated sodium percarbonate particles according to the invention, the core of which has been prepared by fluidized bed build-up granulation, show an improved storage stability in detergent and cleaning agent formulations compared with particles in which the core has been prepared by another process.

The coated sodium percarbonate particles according to the invention also comprise, in addition to the core of sodium percarbonate, an inner shell layer which comprises at least one inorganic, hydrate-forming salt as the main constituent, and an outer shell layer which comprises an alkali metal thiosulfate, an alkaline earth metal thiosulfate and/or an ammonium thiosulfate. The inner shell layer comprises at least one inorganic, hydrate-forming salt as the main constituent if it comprises no further component in a weight content which is greater than the total contents of all the inorganic, hydrate-forming salts. The inner shell layer preferably comprises one or more inorganic, hydrate-forming salts to the extent of at least 50 wt. %. Inorganic, hydrate-forming salts in the context of the invention are salts which can bond water in the crystal lattice, contain no organic radicals and are not oxidized by sodium percarbonate.

In addition to this inner and outer shell layer, the sodium percarbonate particles according to the invention can also comprise one or more further shell layers, it being possible for these to be arranged both between the core and the inner shell layer and between the inner and the outer shell layer as well as outside the outer shell layer.

A sharp boundary at which the composition changes suddenly can exist between the shell layers and between the innermost shell layer and the core. As a rule, however, a transition zone which comprises the components of the two layers adjacent to one another will form in each case between the individual shell layers and between the innermost shell layer and the core. Such transition zones are formed, for example, by application of a shell layer in the form of an aqueous solution, at the start of the build-up of the layer some of the layer lying underneath being superficially dissolved, so that a transition zone forms which comprises the constituents of both layers. A transition layer which comprises sodium percarbonate, sodium carbonate, sodium bicarbonate and the inorganic, hydrate-forming salt of the inner shell layer can thus form between the core and the inner shell layer. In a similar manner, a transition layer which comprises the inorganic, hydrate-forming salt of the inner shell layer and the thiosulfate salt of the outer shell layer can form between the inner shell layer and the outer shell layer.

The inner shell layer and outer shell layer are preferably built up such that they cover the material lying underneath to the extent of more than 95%, preferably to the extent of more than 98%, and in particular completely.

The inner shell layer of the coated sodium percarbonate particles according to the invention comprises at least one inorganic, hydrate-forming salt, preferably one or more hydrate-forming salts of an alkali metal and/or alkaline earth metal, as the main constituent. The content of the inner shell layer in the coated sodium percarbonate particles according to the invention is preferably in the range from 0.1 to 10 wt. %, particularly preferably in the range from 2 to 7 wt. %. The content of inorganic, hydrate-forming salt in the material of the inner shell layer is preferably at least 50 wt. %, particularly preferably at least 90 wt. %. The weight contents are in each case calculated for the inorganic, hydrate-forming salt in the anhydrous form. The inorganic, hydrate-forming salt of the inner shell layer is preferably chosen from the series consisting of sodium sulfate, sodium carbonate, sodium bicarbonate or magnesium sulfate. Mixtures and mixed salts of these compounds are also suitable. The inner shell layer particularly preferably comprises sodium sulfate as the inorganic, hydrate-forming salt. In a particularly preferred embodiment, the inner shell layer substantially consists of sodium sulfate.

The outer shell layer of the coated sodium percarbonate particles according to the invention comprises an alkali metal thiosulfate, an alkaline earth metal thiosulfate and/or an ammonium thiosulfate as the main constituent. The content of the outer shell layer in the coated sodium percarbonate particles according to the invention is preferably in the range from 0.1 to 10 wt. %, particularly preferably 0.5 to 5 wt. %, and in particular 1 to 3 wt. %.

The content of alkali metal thiosulfate, alkaline earth metal thiosulfate and ammonium thiosulfate in the material of the outer shell layer is preferably at least 5 wt. %, particularly preferably at least 50 wt. %, and in particular more than 90 wt. %. The weight contents are in each case calculated for the alkali metal thiosulfate, alkaline earth metal thiosulfate and/or ammonium thiosulfate in the anhydrous form. The outer shell layer preferably comprises sodium thiosulfate. In a particularly preferred embodiment, the outer shell layer substantially consists of sodium thiosulfate.

The coated sodium percarbonate particles according to the invention show an unexpectedly high storage stability, although they comprise, in the same particle, an oxidizing agent and a reducing agent, which can react with one another with severe evolution of heat. The evolution of heat of the coated sodium percarbonate particles according to the invention, determined by TAM measurement by means of a Thermal Activity Monitor from Thermometric AB, Järfälla (SE), is preferably less than 10 µW/g, and particularly preferably less than 7 µW/g, after storage at 40° C. for 48 h. The high storage stability and low evolution of heat renders possible storage of the coated sodium percarbonate particles according to the invention in large silos without the risk of a self-accelerating decomposition of the material stored in the silo.

The coated sodium percarbonate particles according to the invention surprisingly also show a better storage stability in detergent and cleaning agent formulations than coated sodium percarbonate particles without a thiosulfate-containing shell layer which comprise comparable amounts of shell material. The improved storage stability in detergent and cleaning agent formulations leads to lower losses of active oxygen content during storage of such formulations in a humid environment.

In a further embodiment of the invention, the coated sodium percarbonate particles have an additional shell layer which comprises an alkali metal silicate having a modulus of $SiO_2$ to alkali metal oxide of more than 2.5 as the main constituent. The additional shell layer preferably lies over the inner shell layer and can then be arranged both between the inner and the outer shell layer and over the outer shell layer. The additional shell layer comprises an alkali metal silicate as the main constituent if it comprises no further component in a weight content which is greater than the content of alkali metal silicate. The modulus of the alkali metal silicate is preferably in the range from 3 to 5, and particularly preferably in the range from 3.2 to 4.2. The content of the additional shell layer in the coated sodium percarbonate particles according to the invention is preferably in the range from 0.2 to 3 wt. %. The content of alkali metal silicate in the material of the additional shell layer is preferably more than 50 wt. %, and particularly preferably more than 80 wt. %. The alkali metal silicate employed in the additional shell layer is preferably sodium silicate, and particularly preferably sodium waterglass.

Sodium percarbonate particles coated according to the invention having an additional shell layer which comprises an alkali metal silicate having a modulus of $SiO_2$ to alkali metal oxide of more than 2.5 as the main constituent additionally show a delayed dissolving time in water and an improved storage stability in aqueous liquid or gel-like media at water contents of up to 15 wt. %. They can therefore advantageously be employed for the preparation of liquid or gel-like detergent or cleaning agent formulations.

In a further embodiment of the invention, the coated sodium percarbonate particles additionally have on their surface 0.01 to 1 wt. %, preferably 0.1 to 0.5 wt. %, of a finely divided oxide of the elements Si, Al or Ti or of a mixed oxide of these elements. Suitable finely divided oxides are, for example, pyrogenic oxides which are obtained by flame hydrolysis of volatile compounds of the elements silicon, aluminium or titanium or of mixtures of these compounds. The pyrogenic oxides or mixed oxides obtainable by this route preferably have an average primary particle size of less than 50 nm and can be aggregated to larger particles, the average particle size of which is preferably less than 20 µm. Precipitated oxides which have been precipitated from aqueous solutions of compounds of the elements silicon, aluminium or titanium or mixtures of these compounds are likewise suitable. The precipitated oxides or mixed oxides can also comprise small amounts of alkali metal or alkaline earth metal ions in addition to silicon, aluminium and/or titanium. The average particle size of the precipitated oxides is preferably less than 50 µm, and particularly preferably less than 20 µm. The specific surface area of the finely divided oxides, measured by the BET method, is preferably in the range from 100 to 300 m²/g.

Preferably, the coated sodium percarbonate particles have on their surface a hydrophobized finely divided oxide, and particularly preferably a hydrophobized pyrogenic or precipitated silica. Hydrophobized oxides in the context of the invention are oxides which have on their surface organic radicals bonded via chemical bonds and are not wetted by water. Hydrophobized oxides can be prepared, for example, by reaction of pyrogenic or precipitated oxides with organosilanes, silazanes or polysiloxanes. Suitable silicon compounds for the preparation of hydrophobized oxides are known from EP-A 0 722 992, page 3, line 9 to page 6, line 6. Hydrophobized oxides which have been prepared by reaction of a finely divided oxide with a silicon compound of the compound classes (a) to (e) and (k) to (m) listed in EP-A 0 722 992 are particularly preferred. The hydrophobized finely divided oxides preferably have a methanol wettability of at least 40.

Sodium percarbonate particles coated according to the invention which additionally have on their surface a finely divided oxide additionally show a lower tendency towards caking during storage, above all during storage under a pressure load, and can therefore be stored in silos without caking. Such particles moreover show a storage stability which is increased further in detergent and cleaning agent formulations.

The sodium percarbonate particles according to the invention preferably have an average particle size in the range from 0.2 to 5 mm, and particularly preferably in the range from 0.5 to 2 mm. Sodium percarbonate particles having a low fine particle content are preferred, preferably having a content of less than 10 wt. % of particles smaller than 0.2 mm, and particularly preferably less than 10 wt. % of particles having a particle size of less than 0.3 mm.

The sodium percarbonate particles according to the invention preferably have a substantially spherical shape with a smooth surface. Particles having a smooth surface have a surface roughness of less than 10% of the particle diameter, and preferably of less than 5% of the particle diameter.

The storage stability of the sodium percarbonate particles according to the invention in detergent and cleaning agent formulations can be improved further by an appropriate choice of the particle size and particle shape.

The process according to the invention for the preparation of coated sodium percarbonate particles comprises the steps of
 a) application of an inner shell layer to a core material of sodium percarbonate by spraying on an aqueous solution in which at least one hydrate-forming inorganic salt is dissolved and
 b) application of an outer shell layer to the coated material from step a) by spraying on an aqueous solution in which at least one alkali metal thiosulfate, alkaline earth metal thiosulfate and/or ammonium thiosulfate is dissolved.

Any product obtained by one of the known preparation processes for sodium percarbonate can in principle be employed as the core material of sodium percarbonate in the process according to the invention. A core material which has been prepared in a known manner from aqueous hydrogen peroxide solution and aqueous soda solution by the process of fluidized bed build-up granulation, and particularly preferably by the process described in EP-A 0 716 640, is preferably employed. Hydrogen peroxide and soda solution are preferably employed in this context in a molar ratio of $H_2O_2$ to $Na_2CO_3$ of 1.4 to 1.7, particularly preferably 1.5 to 1.65. Hydrogen peroxide is employed as an aqueous solution with preferably 30 to 75 wt. % $H_2O_2$, particularly preferably 40 to 70 wt. % $H_2O_2$. The hydrogen peroxide solution can additionally comprise stabilizing additives, such as e.g. complexing agents or magnesium compounds. The soda solution is preferably employed with a concentration of between 10 wt. % sodium carbonate and the saturation concentration of sodium carbonate, particularly preferably between 20 wt. % sodium carbonate and the saturation concentration of sodium carbonate. The soda solution can likewise comprise stabilizing additives, such as e.g. water-glass. In the process of fluidized bed build-up granulation, the water introduced with the starting substances is evaporated and removed by feeding a drying gas into the fluidized bed. Air or a combustion gas which is obtained by burning a fuel, such as, for example, natural gas, with air is preferably used as the drying gas. The drying gas is preferably fed to the fluidized bed with a temperature of between 120 and 400° C., particularly preferably between 200 and 400° C. The temperature in the fluidized bed is preferably kept between 40 and 95° C., in particular between 40 and 80° C., and especially between 50 and 70° C.

In a preferred embodiment, seed material is fed to the fluidized bed in an amount which leads to the formation of granules having an average particle size in the range from 0.2 to 2 mm. The core material is preferably discharged from the fluidized bed by a grading process, and particularly preferably by the process described in EP-A 0 938 922, such that preferably more than 90 wt. % of the core material particles discharged from the fluidized bed have a diameter of more than 0.2 mm.

In the process according to the invention, the application of the inner shell layer is carried out by spraying on an aqueous solution in which at least one hydrate-forming inorganic salt is dissolved. In addition to the dissolved hydrate-forming inorganic salt, the aqueous solution preferably contains no further dissolved components in weight contents which are greater than the weight of the dissolved hydrate-forming inorganic salt, calculated in the anhydrous form. The inner shell layer is particularly preferably applied by spraying on an aqueous sodium sulfate solution. During spraying on of the aqueous solution, the majority of the water contained therein, in particular more than 90% of the water contained in the aqueous solution, is preferably already evaporated by introduction of heat, so that only a small part of the core material is superficially dissolved again during application of the inner shell layer and a firm shell layer which comprises the hydrate-forming inorganic salt is already formed during the spraying on. The inner shell layer is preferably applied by spraying an aqueous solution containing the hydrate-forming inorganic salt in a fluidized bed, and particularly preferably by the process described in EP-A 0 970 917, with which a dense shell layer can already be achieved with small amounts of shell layer material. The application of the inner shell layer in a fluidized bed is preferably carried out while feeding a drying gas to the fluidized bed such that a temperature in the range from 30 to 90° C. is established in the fluidized bed. The amount of solution sprayed on is preferably chosen such that the content of the inner shell layer in the coated sodium percarbonate particles obtained as the end product of the process is in the range from 0.1 to 10 wt. %, particularly preferably in the range from 2 to 7 wt. %.

In the process according to the invention, the application of the outer shell layer is carried out by spraying on an aqueous solution in which at least one alkali metal thiosulfate, one alkaline earth metal thiosulfate and/or one ammonium thiosulfate is dissolved. In addition to the alkali metal thiosulfate, alkaline earth metal thiosulfate and/or ammonium thiosulfate, the aqueous solution preferably contains not more than 95 wt. %, particularly preferably not more than 50 wt. %, and in particular not more than 10 wt. %, of further dissolved constituents. The outer shell layer is preferably applied by spraying on an aqueous solution which contains sodium thiosulfate. During spraying on of the aqueous solution, the majority of the water contained therein, in particular more than 90% of the water contained in the aqueous solution, is preferably already evaporated by introduction of heat, so that only a small part of the material lying underneath is superficially dissolved again during application of the outer shell layer and a firm thiosulfate-containing shell layer is already formed during the spraying on. The outer shell layer is preferably applied by spraying the aqueous thiosulfate-containing solution in a fluidized bed, and particularly preferably by the process described in EP-A 0 970 917, with which a dense shell layer can already be achieved with small amounts of shell layer material. The application of the outer shell layer in a fluidized bed is preferably carried out while feeding a drying gas to the fluidized bed such that a temperature in the range from 30 to 90° C. is established in the fluidized bed. The amount of solution sprayed on is preferably chosen such that the content of the outer shell layer in the coated sodium percarbonate particles obtained as the end product of the process is in the range from 0.1 to 10 wt. %, particularly preferably 0.5 to 5 wt. %, and in particular 1 to 3 wt. %.

In a further embodiment of the process, an additional shell layer is applied by spraying on an aqueous solution containing alkali metal silicate, the modulus of $SiO_2$ to alkali metal oxide of the alkali metal silicate being more than 2.5, and preferably in the range from 3 to 5, particularly preferably in the range from 3.2 to 4.2. Preferably, an aqueous solution having a concentration of alkali metal silicate in the range from 2 to 20 wt. %, particularly preferably 3 to 15 wt. %, and in particular 5 to 10 wt. %, is used here. A so-called water-glass solution is preferably sprayed on for application of a shell layer substantially of sodium silicate. In addition to the alkali metal silicate, the aqueous solution preferably contains no further dissolved components in weight contents which are greater than the weight of the alkali metal silicate. The inner shell layer is particularly preferably applied by spraying on an aqueous solution of sodium water-glass. The application of this additional shell layer can take place before the application of the inner shell layer, between the application of the inner and the application of the outer shell layer or after the application of the outer shell layer. The additional shell layer is preferably applied after the application of the inner shell layer. During spraying on of the aqueous solution containing an alkali metal silicate, the majority of the water contained therein, in particular more than 90% of the water contained in the aqueous solution, is preferably already evaporated by introduction of heat, so that only a small part of the material lying underneath is superficially dissolved again during application of the additional shell layer and a firm shell layer comprising alkali metal silicate is already formed during the spraying on. The additional shell layer is preferably applied by spraying the aqueous solution containing alkali metal silicate in a fluidized bed, and particularly preferably by the process described in EP-A 0 970 917, with which a dense shell layer can already be achieved with small amounts of shell layer material. The application of the additional shell layer in a fluidized bed is preferably carried out while feeding a drying gas to the fluidized bed such that a temperature in the range from 30 to 90° C. is established in the fluidized bed. The amount of solution sprayed on is preferably chosen such that the content of the additional shell layer in the coated sodium percarbonate particles obtained as the end product of the process is in the range from 0.2 to 3 wt. %.

In a preferred embodiment of the process, after the application of the shell layers by spraying on aqueous solutions, 0.01 to 1 wt. %, preferably 0.1 to 0.5 wt. %, of a finely divided oxide of the elements Si, Al or Ti or of a mixed oxide of these elements is also applied to the surface of the coated sodium percarbonate particles. The finely divided oxide is preferably applied to the surface of the coated sodium percarbonate particles by mixing the coated sodium percarbonate particles with the finely divided oxide in the dry-state. The sodium percarbonate particles are preferably dispersed in a gas phase for mixing with the finely divided oxide. In this preferred embodiment of the application, the mixing operation can be carried out, for example, in a fluidized bed, in a fall pipe or in an entrained flow conveyor.

Pyrogenic oxides which have been prepared by flame hydrolysis of volatile compounds of the elements silicon, aluminium or titanium or of mixtures of these compounds and preferably have an average primary particle size of less than 50 nm and an average particle size of the aggregates of primary particles of less than 20 µm can be employed as finely divided oxides. Precipitated oxides which have been precipitated from aqueous solutions of compounds of the elements silicon, aluminium or titanium or mixtures of these compounds and preferably have an average particle size of less than 50 µm, particularly preferably less than 20 µm, are likewise suitable. Preferably, hydrophobized finely divided oxides, and particularly preferably hydrophobized pyrogenic or precipitated silica, are used. Hydrophobized oxides in the context of the invention are oxides which have on their surface organic radicals bonded via chemical bonds and are not wetted by water.

The coated sodium percarbonate particles according to the invention can advantageously be used as a bleaching-active constituent in detergents and cleaning agents. Detergents in the context of the invention are all formulations which are suitable for cleaning textiles in an aqueous wash liquor. Cleaning agents in the context of the invention are all formulations which are suitable, in interaction with water, for cleaning surfaces which absorb no or only little water. Machine dishwashing agents which are suitable for mechanical cleaning of utensils and cutlery are a form of cleaning agents which is preferred in the context of the invention.

The invention also provides detergents and cleaning agents which comprise sodium percarbonate particles coated according to the invention. The detergents and cleaning agents according to the invention preferably comprise the coated sodium percarbonate particles according to the invention in an amount of 1 to 40 wt. %, based on the total amount of detergent or cleaning agent.

The detergents and cleaning agents according to the invention can have a solid form, and can then also comprise further components in the form of a powder or in the form of granules, in addition to the coated sodium percarbonate particles according to the invention. They can moreover also comprise pressed shaped bodies, it being possible for the coated sodium percarbonate particles according to the invention to be a constituent of the pressed shaped bodies. Such pressed shaped bodies in the form of extrudates, pellets, briquettes or tablets can be produced by processes of compression agglomeration, in particular by extrusion, strand pressing, perforation pressing, roller compacting or tabletting. For carrying out the compression agglomeration, the detergents or cleaning agents according to the invention can additionally comprise a binder which imparts a higher strength to the shaped bodies during the compression agglomeration. However, in the case of detergents and cleaning agents according to the invention which comprise pressed shaped bodies, preferably no additional binder is used, and one of the wash-active constituents, for example a nonionic surfactant, fulfils the function of the binder.

The detergents and cleaning agents according to the invention can moreover also have a liquid form or gel form and comprise the coated sodium percarbonate particles according to the invention dispersed in a liquid phase or a gel phase. In addition to the coated sodium percarbonate particles according to the invention, further particles can be dispersed in the liquid phase or the gel phase. The rheological properties of the liquid phase or of the gel phase are preferably adjusted such that the particles dispersed therein remain suspended and do not settle during storage. The composition of a liquid phase is therefore preferably chosen such that it has thixotropic or pseudoplastic flow properties. Suspension auxiliaries, such as swelling clays, in particular montmorillonites, precipitated and pyrogenic silicas, vegetable gums, in particular xanthans, and polymeric gelling agents, such as vinyl polymers containing carboxyl groups, can be added for adjustment of such flow properties.

Detergents and cleaning agents according to the invention in liquid form or gel form preferably comprise coated sodium percarbonate particles according to the invention having an additional shell layer which comprises an alkali metal silicate having a modulus of $SiO_2$ to alkali metal oxide of more than 2.5 as the main constituent. In this embodiment, the detergents and cleaning agents can comprise up to 15 wt. % water, without superficial dissolving of the coated sodium percarbonate particles and a release of hydrogen peroxide into the liquid phase or gel phase thereby caused occurring during storage.

The detergents and cleaning agents according to the invention can also comprise, for example, surfactants, builders, alkaline components, bleaching activators, enzymes, chelating complexing agents, greying inhibitors, foam inhibitors, optical brighteners, fragrances and dyestuffs as further components in addition to the coated sodium percarbonate particles according to the invention.

Suitable surfactants for the detergents and cleaning agents according to the invention are, above all, anionic, nonionic and cationic surfactants.

Suitable anionic surfactants are, for example, surfactants having sulfonate groups, preferably alkylbenzenesulfonates, alkanesulfonates, alpha-olefinsulfonates, alpha-sulfo-fatty acid esters or sulfosuccinates. In the case of alkylbenzenesulfonates, those having a straight-chain or branched alkyl group having 8 to 20 carbon atoms, in particular having 10 to 16 carbon atoms, are preferred. Preferred alkanesulfonates are those having straight-chain alkyl chains having 12 to 18 carbon atoms. In the case of alpha-olefinsulfonates, the reaction products of the sulfonation of alpha-olefins having 12 to 18 carbon atoms are preferably employed. In the case of the alpha-sulfo-fatty acid esters, sulfonation products of fatty acid esters of fatty acids having 12 to 18 carbon atoms and short-chain alcohols having 1 to 3 carbon atoms are preferred. Surfactants having a sulfate group in the molecule, preferably alkyl sulfates and ether sulfates, are also suitable anionic surfactants. Preferred alkyl sulfates are those having straight-chain alkyl radicals having 12 to 18 carbon atoms. Beta-branched alkyl sulfates and alkyl sulfates mono- or polysubstituted by alkyl in the middle of, the longest alkyl chain are furthermore suitable. Preferred ether sulfates are the alkyl ether sulfates which are obtained by ethoxylation of linear alcohols having 12 to 18 carbon atoms with 2 to 6 ethylene oxide units and subsequent sulfation. Finally, soaps can also be used as anionic surfactants, such as, for example, alkali metal salts of lauric acid, myristic acid, palmitic acid, stearic acid and/or naturally occurring fatty acid mixtures, such as, for example, coconut, palm kernel or tallow fatty acids.

Suitable nonionic surfactants are, for example, alkoxylated compounds, in particular ethoxylated and propoxylated compounds. Condensation products of alkylphenols or fatty alcohols with 1 to 50 mol, preferably 1 to 10 mol of ethylene oxide and/or propylene oxide are particularly suitable. Polyhydroxy-fatty acid amides in which an organic radical having one or more hydroxyl groups, which can also be alkoxylated, is bonded to the amide nitrogen are likewise suitable. Alkyl glycosides having a straight-chain or branched alkyl group having 8 to 22 carbon atoms, in particular having 12 to 18 carbon atoms, and a mono- or diglycoside radical, which is preferably derived from glucose, are likewise suitable as non-ionic surfactants.

Suitable cationic surfactants are, for example, mono- and dialkoxylated quaternary amines having a $C_6$- to $C_{18}$-alkyl radical bonded to the nitrogen and one or two hydroxyalkyl groups.

The detergents and cleaning agents according to the invention furthermore comprise builders which are capable, during use, of bonding calcium and magnesium ions dissolved in the water. Suitable builders are alkali metal phosphates and alkali metal polyphosphates, in particular pentasodium triphosphate; water-soluble and water-insoluble sodium silicates, in particular layered silicates of the formula $Na_5Si_2O_5$; zeolites of the structures A, X and/or P; and trisodium citrate. In addition to the builders, organic co-builders, such as, for example, polyacrylic acid, polyaspartic acid and/or acrylic acid copolymers with methacrylic acid, acrolein or vinyl monomers containing sulfonic acid groups, as well as alkali metal salts thereof, can furthermore be used.

The detergents and cleaning agents according to the invention furthermore as a rule comprise alkaline components which, when used as intended in the wash liquor or the aqueous cleaning agent solution, effect a pH in the range from 8 to 12. Suitable alkaline components are, above all, sodium carbonate, sodium sesquicarbonate, sodium metasilicate and other soluble alkali metal silicates. Suitable bleaching activators for the detergents and cleaning agents according to the invention are, above all, compounds having one or more acyl groups bonded to nitrogen or to oxygen which are capable of perhydrolysis and react in the wash liquor or the aqueous cleaning agent solution with the hydrogen peroxide released from the sodium percarbonate particles to give peroxycarboxylic acids. Examples of such compounds are polyacylated alkylenediamines, such as, in particular, tetraacetylethylenediamine (TAED); acylated triazine derivatives, in particular 1,5-diacetyl-2,4-dioxohexahydro-1,3,5-triazine (DADHT); acylated glycol urils, in particular tetraacetylglycol uril (TAGU); N-acylimides, in particular N-nonanoylsuccinimide (NOSI); acylated phenolsulfonates, in particular n-nonanoyl- or iso-nonanoyloxybenzenesulfonate (n- or iso-NOBS); carboxylic acid anhydrides, such as phthalic anhydride; acylated polyhydric alcohols, such as ethylene glycol diacetate, 2,5-diacetoxy-2,5-dihydrofuran, acetylated sorbitol and mannitol and acylated sugars, such as pentaacetylglucose; enol esters; and N-acylated lactams, in particular N-acylcaprolactams and N-acylvalerolactams. Amino-functionalized nitriles and salts thereof (nitrile quats), which are known, for example, from the journal Tenside Surf. Det. 1997, 34(6), pages 404-409, are likewise suitable as bleaching activators. Transition metal complexes which can activate hydrogen peroxide for bleaching removal of spots can furthermore be employed as bleaching activators. Suitable transition metal complexes are known, for example, from EP-A 0 544 490 page 2, line 4 to page 3, line 57; WO 00/52124 page 5, line 9 to page 8, line 7 and page 8, line 19 to page 11, line 14; WO 04/039932, page 2, line 25 to page 10, line 21; WO 00/12808 page 6, line 29 to page 33, line 29; WO 00/60043 page 6, line 9 to page 17, line 22; WO 00/27975, page 2, lines 1 to 18 and page 3, line 7 to page 4, line 6; WO 01/05925, page 1, line 28 to page 3, line 14; WO 99/64156, page 2, line 25 to page 9, line 18; and GB-A 2 309 976, page 3, line 1 to page 8, line 32.

The detergents and cleaning agents according to the invention can moreover comprise enzymes which intensify the cleaning action, in particular lipases, cutinases, amylases, neutral and alkaline proteases, esterases, cellulases, pectinases, lactases and/or peroxidases. In this context, the enzymes can be adsorbed on carrier substances or embedded in coating substances in order to protect them from decomposition.

The detergents and cleaning agents according to the invention can moreover comprise chelating complexing agents for transition metals, with which a catalytic decomposition of active oxygen compounds in the wash liquor or the aqueous cleaning agent solution can be inhibited. Suitable agents are, for example, phosphonates, such as hydroxyethane-1,1-diphosphonate, nitrilotrimethylenephosphonate, diethylenetriamine-penta(methylenephosphonate), ethylenediamine-tetra(methylenephosphonate), hexamethylenediamine-tetra (methylenephosphonate) and alkali metal salts thereof. Nitrilotriacetic acid and polyaminocarboxylic acids, such as, in particular, ethylenediaminetetraacetic acid, diethylenetri-aminepentaacetic acid, ethylenediamine-N,N'-disuccinic acid, methylglycinediacetic acid and polyaspartates, as well as alkali metal and ammonium salts thereof, are likewise suitable. Finally, polybasic carboxylic acids and, in particular, hydroxycarboxylic acids, such as, in particular, tartaric acid and citric acid, are also suitable as chelating complexing agents.

The detergents according to the invention can additionally comprise greying inhibitors which keep dirt detached from the fibre in suspension and prevent re-absorption of the dirt onto the fibre. Suitable greying inhibitors are, for example, cellulose ethers, such as carboxymethylcellulose and alkali metal salts thereof, methylcellulose, hydroxyethylcellulose and hydroxypropylcellulose. Polyvinylpyrrolidone is likewise suitable.

The detergents and cleaning agents according to the invention can furthermore also comprise foam inhibitors which reduce foam formation in the wash liquor. Suitable foam inhibitors are, for example, organopolysiloxanes, such as polydimethylsiloxane, paraffins and/or waxes, as well as mixtures thereof with finely divided silicas.

The detergents according to the invention can optionally comprise optical brighteners which are absorbed on to the fibres, absorb light in the UV range and show blue fluorescence, in order to compensate yellowing of the fibres. Suitable optical brighteners are, for example, derivatives of diaminostilbenedisulfonic acid, such as alkali metal salts of 4,4'-bis-(2-anilino-4-morpholino-1,3,5-triazinyl-6-amino)-stilbene-2,2-disulfonic acid, or substituted diphenylstyryls, such as alkali metal salts of 4,4'-bis-(2-sulfostyryl)-diphenyl.

Finally, the detergents and cleaning agents according to the invention can also additionally comprise fragrances and dyestuffs.

Detergents and cleaning agents according to the invention in liquid form or gel form can additionally also comprise up to 30 wt. % of organic solvents, such as, for example, methanol, ethanol, n-propanol, isopropanol, n-butanol, ethylene glycol, 1,2-propylene glycol, 1,3-propylene glycol, 1,4-butylene glycol, glycerol, diethylene glycol, ethylene glycol methyl ether, ethanolamine, diethanolamine and/or triethanolamine.

The detergents and cleaning agents according to the invention show a better storage stability with lower losses of active oxygen content during storage under humid conditions compared with detergents and cleaning agents which comprise sodium percarbonate particles which have not been coated according to the invention. At the same time, there is a reduced oxidative attack on oxidation-sensitive constituents of the detergent or cleaning agent, such as, for example, enzymes, optical brighteners, fragrances and dyestuffs. The oxidative attack on oxidation-sensitive constituents here is significantly lower than in the case of detergents and cleaning agents which comprise coated sodium percarbonate particles which are not according to the invention and, separately from these, a comparable amount of a thiosulfate.

Machine dishwashing agents in the form of tablets are a preferred embodiment of the cleaning agents according to the invention, the tablets also comprising, in addition to the coated sodium percarbonate particles according to the invention, a corrosion protection agent for silver. Corrosion protection agents for silver in the context of the invention are agents which prevent or reduce tarnishing of nonferrous metals, in particular silver, during mechanical cleaning with the machine dishwashing agent.

Corrosion protection agents for silver which are preferably employed are one or more compounds from the series consisting of triazoles, benzotriazoles, bisbenzotriazoles, aminotriazoles and alkylaminotriazoles. In this context, the compounds of the substance classes mentioned can also contain substituents, such as, for example, linear or branched alkyl groups having 1 to 20 C atoms, as well as vinyl, hydroxyl, thiol or halogen radicals. In the case of bisbenzotriazoles, compounds in which the two benzotriazole groups are in each case bonded in the 6-position via a group X, wherein X can be a bond, a straight-chain alkylene group having preferably 1 to 6 carbon atoms and optionally substituted by one or more $C_1$- to $C_4$-alkyl groups, a cycloalkyl radical having at least 5 carbon atoms, a carbonyl group, a sulfonyl group or an oxygen or a sulfur atom, are preferred. Tolyltriazole is a particularly preferred corrosion protection agent for silver.

The machine dishwashing agents according to the invention in the form of tablets, comprising a corrosion protection agent for silver, show a considerably lower yellowing of the tablets during storage of the machine dishwashing agent compared with machine dishwashing agents which comprise sodium percarbonate particles without a thiosulfate-containing shell layer.

EXAMPLES

Preparation of Coated Sodium Percarbonate Particles

Sodium percarbonate particles which were prepared from aqueous hydrogen peroxide solution and aqueous soda solution by fluidized bed build-up granulation by the process described in EP-B 0 716 640 and had an average particle diameter $x_{50}$ of 0.65 mm and a fine particle content smaller than 0.2 mm of less than 2 wt. % were employed for the preparation of coated sodium percarbonate particles. The shell layers were applied to these particles by the process described in EP-B 0 863 842 in paragraph [0021] by spraying on of aqueous solutions of the shell substances in a fluidized bed at a fluidized bed temperature of 50 to 70° C. and simultaneously evaporating off water. Sodium sulfate was sprayed on as a 20 wt. % strength aqueous solution, and sodium thiosulfate as a 20 wt. % strength aqueous solution. Waterglass was sprayed on as a 10 wt. % strength aqueous solution of sodium water-glass having a modulus of $SiO_2:Na_2O$ of 3.3. The amounts of shell substances stated in percent by weight in the examples relate to the amount of shell substance sprayed on, calculated without water of crystallization, in relation to the total amount of sodium percarbonate particles employed and shell substances sprayed on.

Determination of the Storage Stability in Bulk

The storage stability of coated sodium percarbonate particles in bulk was determined by microcalorimetric determination of the energy released during storage at 40° C. using a TAM® Thermal Activity Monitor from Thermometric AB, Järfälla (SE), and the TAM value after 48 h was determined as the measurement value. A sodium percarbonate is sufficiently stable to storage if the TAM value for the energy released after 48 h is no more than 10 µW/g and does not increase further during further storage.

Figure 1:
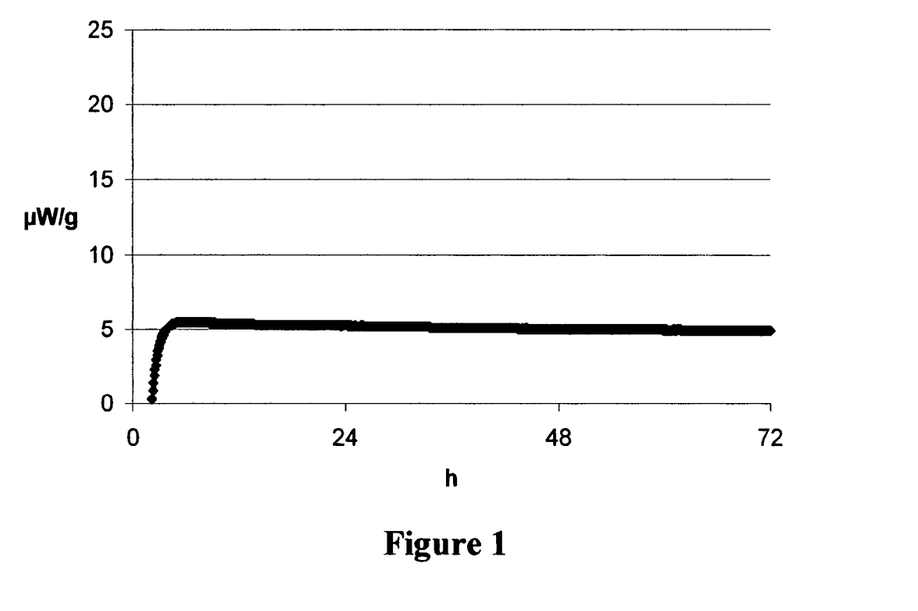
FIG. 1 shows the release of energy from the sodium percarbonate particles according to the invention of Example 1 in µW/g during storage at 40° C., determined with a TAM® Thermal Activity Monitor from Thermometric AG, Järfälla (SE), plotted against the storage time in hours.
Figure 2:
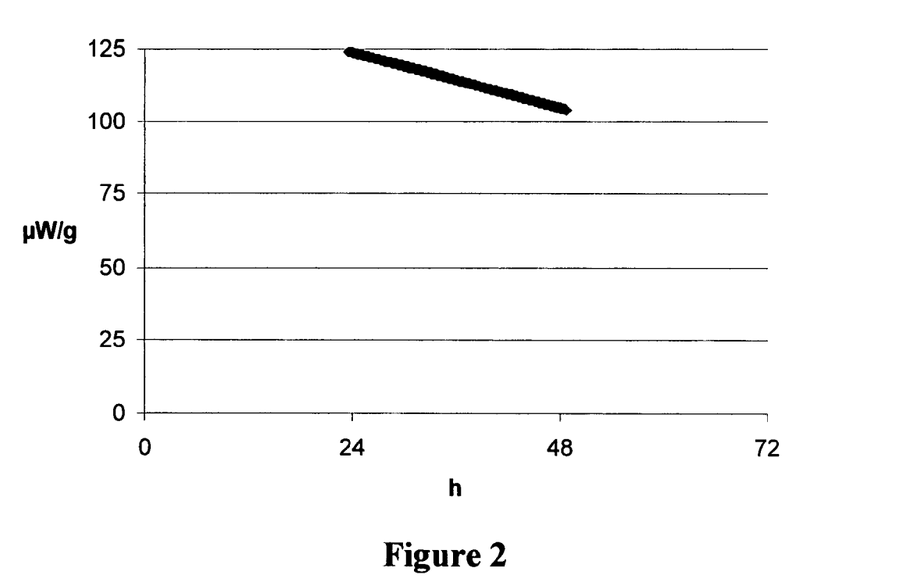
FIG. 2 shows the release of energy, determined under the same conditions, from the sodium percarbonate particles from Example 2 which are not according to the invention.
Figure 3:
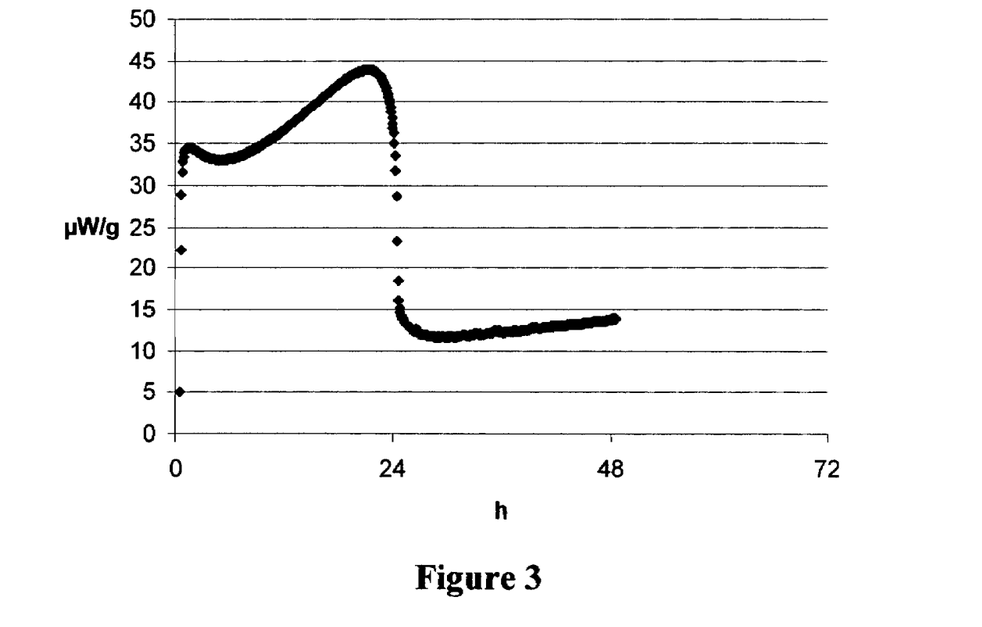
FIG. 3 shows the release of energy, determined under the same conditions, from the sodium percarbonate particles from Example 3 which are not according to the invention.
Figure 4:
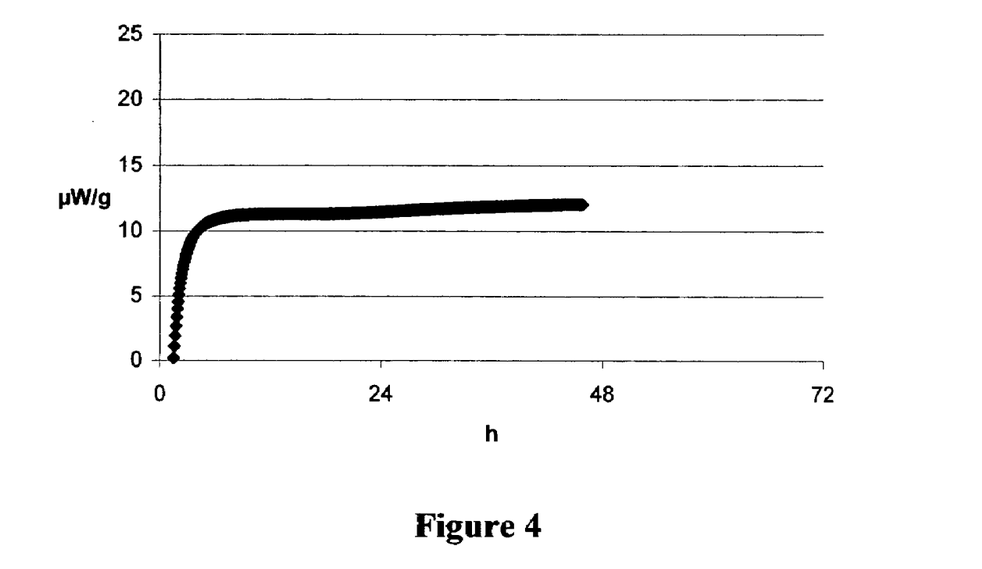
FIG. 4 shows the release of energy, determined under the same conditions, from the sodium percarbonate particles from Example 4 which are not according to the invention.

As described above, a first shell layer of sodium sulfate and a second shell layer of a reducing agent were applied to sodium percarbonate particles. The reducing agents used and the amounts of the shell layers are given in Table 1 with the TAM values after 48 h. The course of the evolution of heat with respect to time is reproduced in FIGS. 1 to 4.

TABLE 1

| Example | Shell layer 1 [wt. %] | Shell layer 2 [wt. %] | TAM [µW/g] |
|---|---|---|---|
| 1 | 3% $Na_2SO_4$ | 3% $Na_2S_2O_3$ | 5.0 |
| 2* | 3% $Na_2SO_4$ | 3% $Na_2SO_3$ | 105 |
| 3* | 3% $Na_2SO_4$ | 3% $Na_2S_2O_5$ | 13.7 |
| 4* | 5% $Na_2SO_4$ | 1% $Na_2HPO_3$ | 12.1 |

*not according to the invention $Na_2S_2O_3$=sodium thiosulfate; $Na_2SO_3$=sodium sulfite;

$Na_2S_2O_5$=sodium pyrosulfite;

$Na_2HPO_3$=disodium hydrogen phosphite

Examples 1 to 4 show that sodium percarbonate particles of adequate storage stability were obtained only with an outer shell layer of sodium thiosulfate. Sodium percarbonate particles having an outer shell layer of sodium sulfite, sodium pyrosulfite or disodium hydrogen phosphite were not stable to storage because of the incompatibility between sodium percarbonate and the reducing agent.

Determination of the Dissolving Time 2.5 g sodium percarbonate particles were dissolved in 1 l water at 20° C. in a thermostatically controlled measuring cell of glass (diameter 130 mm, height 150 mm), while stirring with a magnetic stirrer. The stirring speed was chosen such that a vortex of 4 cm depth formed. The change in the electrical conductivity of the solution was measured during the dissolving operation. The dissolving time is the time in which 90% of the final conductivity is reached.

Storage Stability in Washing Powder

For determination of the storage stability in washing powder, 405 g of zeolite-containing heavy-duty washing powder were mixed with 15 g TAED and 80 g sodium percarbonate in a tumble mixer. The mixture was filled into an E2 detergent pack (dimensions 19×14×4.5 cm), which had been impregnated with a water-repellent treatment, and this was closed using a hot-melt adhesive. The detergent pack was then stored in a climatic test chamber at 35° C. and 80% relative atmospheric humidity. The active oxygen content after storage was determined permanganometrically in the conventional manner. From the active oxygen content before the storage and the active oxygen content after storage for 8 weeks, the retention of the active oxygen content (Oa retention) in percent was determined.

As described above, one, two or three shell layers were applied to sodium percarbonate particles. The shell substances used and the amounts of the shell layers are shown in Table 2 with the TAM values, the dissolving times and the retention of the active oxygen content in a mixture with washing powder after 8 weeks.

the mixture obtained comprised 10 wt. % sodium percarbonate. The liquid mixture was stored at 23° C. in 50 ml polyethylene drums for 2 days, the drums being turned over their heads mechanically at 15 revolutions per minute in order to keep the sodium percarbonate particles suspended. The active oxygen content after storage was determined iodometrically in the conventional manner. From the active oxygen content before the storage and the active oxygen content after storage for 2 days, the retention of the active oxygen content (Oa retention) in percent was determined.

As described above, one, two or three shell layers were applied to sodium percarbonate particles. The shell substances used and the amounts of the shell layers are given in Table 3 with the active oxygen content retained in the liquid detergent after 2 days.

TABLE 3

| Example | Shell layer 1 [wt. %] | Shell layer 2 [wt. %] | Shell layer 3 [wt. %] | Oa retention |
|---|---|---|---|---|
| 5* | 6% Na$_2$SO$_4$ | | | 83% |
| 9* | 6% Na$_2$SO$_4$ | 0.9% WG | | 88% |
| 8 | 3% Na$_2$SO$_4$ | 0.9% WG | 3% Na$_2$S$_2$O$_3$ | 94% |

*not according to the invention

Na$_2$S$_2$O$_3$=sodium thiosulfate; WG=sodium water-glass, modulus 3.3

The coated sodium percarbonate particles according to the invention of Example 8 also showed a considerably better

TABLE 2

| Example | Shell layer 1 [wt. %] | Shell layer 2 [wt. %] | Shell layer 3 [wt. %] | TAM [μW/g] | Dissolving time [min] | Oa retention |
|---|---|---|---|---|---|---|
| 5* | 6% Na$_2$SO$_4$ | | | 1.8 | 1.0 | 48% |
| 1 | 3% Na$_2$SO$_4$ | 3% Na$_2$S$_2$O$_3$ | | 5.0 | 1.1 | 86% |
| 6* | 3% Na$_2$S$_2$O$_3$ | 3% Na$_2$SO$_4$ | | 83 | | 44% |
| 7 | 3% Na$_2$SO$_4$ | 3% Na$_2$S$_2$O$_3$ | 0.9% WG | 5.7 | 2.1 | 85% |
| 8 | 3% Na$_2$SO$_4$ | 0.9% WG | 3% Na$_2$S$_2$O$_3$ | 3.6 | 4.7 | 82% |

*not according to the invention

Na$_2$S$_2$O$_3$=sodium thiosulfate; WG=sodium water-glass, modulus 3.3

The coated sodium percarbonate particles according to the invention of Examples 1, 7 and 8 showed a considerably better storage stability in the washing powder than the product from Example 5 which was coated only with sodium sulfate. The sodium percarbonate particles from Example 6, which are not according to the invention and comprised sodium thiosulfate in the inner shell layer in direct contact with the core material, were not stable in bulk, with a TAM value of 83 μW/g, and showed no improved storage stability in the washing powder. The coated sodium percarbonate particles according to the invention of Examples 7 and 8 show that an additional shell layer of sodium water-glass having a modulus of 3.3 increases the dissolving time of the particles.

Storage Stability in Liquid Detergent

For determination of the storage stability in liquid detergent, sodium percarbonate particles were mixed with a liquid base recipe of 9.7 wt % monoethanolamine, 4.0 wt. % water, 3.7 wt. % ethanol, 16.1 wt. % phenoxyethanol, 23.6 wt. % C$_{13}$-C$_{15}$-fatty alcohol polyglycol ether, 25.8 wt. % dodecylbenzenesulfonate and 17.2 wt. % coconut fatty acid, such that storage stability in a liquid detergent than the sodium percarbonate particles which are not according to the invention of Examples 5 and 9, which had no thiosulfate-containing shell layer.

Preparation of Dishwashing Agent Tablets

Sodium percarbonate particles were mixed with a dishwashing agent powder which comprised 1.2 wt. % TAED and 0.2 wt. % benzotriazole such that the mixture comprised 12.2 wt. % sodium percarbonate. The mixture was stored at room temperature for 4 days and the TAM value of the mixture was then determined. Thereafter, in each case 15 g of the mixture were pressed to parallelepipedal tablets having dimensions of 4×3×1 cm in a tablet press under a compacting pressure of 50 kN with a pressing time of 15 s. The tablets were packed individually in plastic envelopes with a clip closure and stored in a cardboard box (dimensions 14×14×6 cm), which was closed with a hot-melt adhesive, at 50° C. for 14 days. After the storage, the active oxygen content was determined iodometrically and the retention of the active oxygen content (Oa retention) in percent was determined. In addition, the yellowing of the tablets was determined on the stored tablets by measurement of the reflectance of light.

As described above, one or two shell layers were applied to sodium percarbonate particles. The shell substances used and the amounts of the shell layers are shown in Table 4. Dishwashing agent tablets were prepared with these coated sodium percarbonate particles as described above, and the mixture of dishwashing agent powder and sodium percarbonate particles employed and the tablets prepared therefrom were analysed.

TABLE 4

| Example | Shell layer 1 [wt. %] | Shell layer 2 [wt. %] | TAM of the mixture [µW/g] | Oa retention | Reflectance |
|---|---|---|---|---|---|
| 10* | 6% Na$_2$SO$_4$ | | 40 | 93% | 68% |
| 11 | 3% Na$_2$SO$_4$ | 3% Na$_2$S$_2$O$_3$ | 5.4 | 99% | 77% |

*not according to the invention

Na$_2$S$_2$O$_3$=sodium thiosulfate

The coated sodium percarbonate particles of Example 11 according to the invention showed a better storage stability both in the non-pressed mixture and in the pressed tablets than the sodium percarbonate particles of Example 10 not according to the invention, which had no thiosulfate-containing shell layer. Moreover, the coated sodium percarbonate particles according to the invention also had the effect of less yellowing of the tablets. Since the yellowing is caused by oxidation of the benzotriazole contained in the dishwashing agent, a lower oxidative attack on the constituents of the dishwashing agent can be concluded from this result.

The invention claimed is:

1. Coated sodium percarbonate particles, comprising
   a) a core of sodium percarbonate;
   b) an inner shell layer comprising at least one inorganic, hydrate-forming salt as the main constituent; and
   c) an outer shell layer comprising an alkali metal thiosulfate, an alkaline earth metal thiosulfate and/or an ammonium thiosulfate.

2. The sodium percarbonate particles of claim 1, wherein said core has been prepared by fluidized bed build-up granulation or by crystallization.

3. The sodium percarbonate particles of claim 1, wherein said inner shell layer constitutes from 0.1 to 10 wt. % of said coated sodium percarbonate particles.

4. The sodium percarbonate particles of claim 1, wherein said inner shell layer comprises at least 50 wt. % of said inorganic, hydrate-forming salt.

5. The sodium percarbonate particles of claim 1, wherein said inorganic, hydrate-forming salt is selected from the group consisting of sodium sulfate, sodium carbonate, sodium bicarbonate, magnesium sulfate, and mixtures or mixed salts of these compounds.

6. The sodium percarbonate particles of claim 1, wherein said inorganic, hydrate-forming salt is sodium sulfate.

7. The sodium percarbonate particles of claim 1, wherein said inner shell consists of sodium sulfate.

8. The sodium percarbonate particles of claim 1, wherein said outer shell layer constitutes from 0.1 to 10 wt. % of said coated sodium percarbonate particles.

9. The sodium percarbonate particles of claim 1, wherein said outer shell layer comprises at least 50 wt. %. of said alkali metal thiosulfate, alkaline earth metal thiosulfate and/or ammonium thiosulfate.

10. The sodium percarbonate particles of claim 1, wherein said outer shell layer comprises sodium thiosulfate.

11. The sodium percarbonate particles of claim 1, wherein said outer shell layer consists of sodium thiosulfate.

12. The sodium percarbonate particles of claim 1, further comprising an additional shell layer which comprises an alkali metal silicate having a modulus of SiO$_2$ to alkali metal oxide of more than 2.5 as a main constituent.

13. The sodium percarbonate particles of claim 1, comprising additionally on their surface 0.01 to 1 wt. % of a hydrophobized finely divided oxide of the elements Si, Al or Ti or of a mixed oxide of these elements.

14. The sodium percarbonate particles of claim 13, wherein said finely divided oxide is a hydrophobized pyrogenic or precipitated silica.

15. A process for the preparation of coated sodium percarbonate particles, comprising the steps of:
   a) applying an inner shell layer to a core material of sodium percarbonate by spraying on an aqueous solution in which at least one hydrate-forming inorganic salt is dissolved and
   b) applying an outer shell layer to the coated material from step a) by spraying on an aqueous solution in which at least one alkali metal thiosulfate, alkaline earth metal thiosulfate and/or ammonium thiosulfate is dissolved.

16. The process of claim 15, wherein said core material is prepared by fluidized bed build-up granulation by spraying an aqueous hydrogen peroxide solution and an aqueous soda solution into a fluidized bed of sodium percarbonate particles and simultaneously evaporating water.

17. The process of claim 15, wherein in steps a) and b) the application of said shell layers is carried out by spraying in a fluidized bed and more than 90% of the water contained in said aqueous solutions is evaporated during the application of the shell layers.

18. A detergent or cleaning agent comprising the coated sodium percarbonate particles of claim 1.

19. The detergent or cleaning agent of claim 18, comprising 1 to 40 wt % of said sodium percarbonate particles.

20. The detergent or cleaning agent of claim 18, comprising pressed shaped bodies wherein said sodium percarbonate particles are a constituent of said pressed shaped bodies.

21. A machine dishwashing agent in the form of tablets, comprising the coated sodium percarbonate particles of claim 1 and a corrosion protection agent for silver.

22. The machine dishwashing agent of claim 21, wherein said corrosion protection agent for silver one or more compounds is selected from the group consisting of: triazoles, benzotriazoles, bisbenzotriazoles, aminotriazoles, alkylaminotriazoles and transition metal complexes thereof.

* * * * *